United States Patent [19]

Nishimoto

[11] 4,126,391

[45] Nov. 21, 1978

[54] PHOTOGRAPHIC PROCESSING APPARATUS

[75] Inventor: Kanichi Nishimoto, Wakayama, Japan

[73] Assignee: Noritsu Koki Co., Ltd., Wakayama, Japan

[21] Appl. No.: 830,198

[22] Filed: Sep. 2, 1977

[30] Foreign Application Priority Data

Sep. 11, 1976 [JP] Japan ................................ 51/108979

[51] Int. Cl.$^2$ ........................ G03B 27/32; G03B 27/52

[52] U.S. Cl. ........................................ 355/27; 354/322

[58] Field of Search .................... 355/27; 354/322, 315

[56] References Cited

U.S. PATENT DOCUMENTS

| | | | |
|---|---|---|---|
| 3,353,470 | 11/1967 | Zane | 354/322 |
| 3,443,503 | 5/1969 | Holm et al. | 354/322 X |
| 3,945,727 | 3/1976 | Nakajima et al. | 355/27 |
| 3,953,873 | 4/1976 | Tholen et al. | 355/27 X |
| 3,987,465 | 10/1976 | Sippel | 355/27 X |

*Primary Examiner*—Richard A. Wintercorn
*Attorney, Agent, or Firm*—Lane, Aitken, Dunner & Ziems

[57] ABSTRACT

A photographic processing apparatus including a printer assembly wherein photographic paper or sheet in a roll form is paid out intermittently for printing, when the sheet is stopped, and the printed sheet is cut to a size corresponding to a frame of a film. The cut sheets are delivered to an automatic photographic sheet distributing assembly, one-by-one, in which the sheets are assembled in rows of two or more, and delivered to a sheet-feeding device, which then supplies the rows of cut sheets to an automatic developing assembly. A large-size photographic paper or sheet, which has been enlarged or printed on another printer, may be directly supplied to the sheet-feeding device and then to the automatic developing assembly. The developing assembly includes a series of treatment tubs which are used in a conventional manner to develop the cut photographic sheets fed in rows, or used together to develop large-size photographic sheets fed one after another.

4 Claims, 6 Drawing Figures

| c | d | e | f | a | b |
|---|---|---|---|---|---|
| | | | | A | |
| | | | A | B | |
| | | A | B | C | |
| | A | B | C | D | |
| A | B | C | D | E | |
| | | D | E | F | |
| | D | E | F | A | |
| D | E | F | A | B | |
| | | A | B | C | |
| | A | B | C | D | |
| A | B | C | D | E | |
| | | D | E | F | |

PHOTOGRAPHIC PROCESSING APPARATUS

BACKGROUND OF THE INVENTION

1. Field of the Invention

This invention relates to an improvement in a photographic processing apparatus, and more particularly to an improved photographic processing apparatus, in which a long photographic paper or sheet in a roll form is charged in a printer on one side thereof and then paid out intermittently for printing when the sheet is stopped; the printed sheet is then cut to a size corresponding to one frame of a film; the printed sheets thus cut are intermittently fed from the printer to an automatic sheet-distributing portion or assembly of the apparatus one by one; cut sheets received in the automatic sheet-distributing portion are delivered in rows of two or more to a sheet-feeding device and then to an automatic developing portion or assembly of the apparatus, which includes a series of treatment tubs to be used in common for the cut sheets fed in parallel in rows two or more, and sheet-conveying members of a given size and configuration and of the same number as that of the sheets fed in parallel, which members run through the series of the treatment tubs.

In addition, in the case of a large size photographic paper or sheet, which has been printed in another printer or in an enlarging device, is directly fed to a sheet-feeding device in the automatic sheet-distributing portion and then to the automatic developing portion, wherein the large size photographic sheet is developed by means of the aforesaid sheet-conveying members, which cooperate with each other.

2. Description of the Prior Art

In the initial phase of progress of an automatic photographic processing apparatus, a long photographic paper or sheet in a roll form is charged in a printer on one side thereof, and the sheet is paid out intermittently for printing when the sheet is stopped. The long photographic sheet thus printed is then taken up into a roll form in the printer on the other side thereof and, is then charged in the upstream end of an automatic developing device including a roller conveying system, and then the roll sheet is paid out for development. However, according to this apparatus, a defective printed portion of a long run of photographic sheet can not be found, until a whole run of the photographic sheet is developed, thus providing considerable disadvantage in reprinting process for a defective printed sheet portion.

To cope with this, there has been proposed an attempt in which a long photographic sheet is not taken up into a roll form, but is cut to a size corresponding to a frame of a film, and then the cut printed sheets are delivered out one by one. The printer is so designed as to cooperate with the roller-conveying, automatic developing device. The photographic sheets thus cut are developed one by one, separately. This system is utilized as so-called quick printing and developing process in a shop, so that a customer may receive pictures in 10 to 20 minutes after placing an order. However, this system suffers from disadvantage in that an automatic developing device takes an excessively long time, as compared with the printing time, i.e., poor efficiency of the development.

To avoid the above shortcoming, there has been proposed another attempt by the inventor, that a long photographic paper or sheet in a roll form is charged in a printing portion on one side thereof; the sheet is then paid out intermittently for printing, when the sheet is stopped; the sheet is then cut to size corresponding to a frame of a film; and the sheets thus cut are fed to several automatic developing devices arranged in parallel for the simultaneous development of several printed sheets, thereby accelerating the developing operation of the printed sheets. In this connection, an automatic sheet-distributing device for feeding sheets in two or more rows in parallel has been developed, and a patent application has been filed with the Japanese Patent Office. This attempt well meets the requirement for quick processing of E size or F size, or small size photographic sheets (E size . . . about 82.5 × 114 mm, F. size . . . about 76 × 118 mm). However, this attempt still suffers from a shortcoming in that a large size photographic sheet has to be developed in another developing device (large size . . . about 252 × 303 mm).

SUMMARY OF THE INVENTION

It is a principal object of the present invention to provide a photographic processing apparatus which is economical and provides improved efficiency in development, while retaining the advantages of the prior are automatic sheet-distributing device, and allowing development of a large size printed sheet in common with the small size printed sheets.

According to the present invention, there is provided a photographic processing apparatus, in which: a long photographic paper or sheet in a roll form is charged in a printer on one side thereof; the sheet is then paid out intermittently for printing when the sheet is stopped; the sheet is cut to a size corresponding to a frame of a film and; the sheets thus cut are then delivered therefrom one by one to an automatic sheet-distributing portion of the apparatus, wherein the cut sheets are delivered therefrom in rows of two or more to a sheet feeding device and then to an automatic developing portion of the apparatus. In addition, a large size printed sheet supply means is separately provided in the automatic sheet distributing portion in a manner to cooperate with the sheet distributing device. The developing portion includes a series of treatment tubs and roller type sheet conveying devices of the same number as the rows of the sheets being delivered from the automatic sheet distributing device to the developing portion. The sheet conveying devices run through the aforesaid series of treatment tubs. Accordingly, the photographic processing apparatus according to the invention may develop not only small size photographic sheets but also a large size photographic sheet.

These and other objects, features and advantages of the present invention will become apparent to those skilled in the art from a reading of the detailed description of the preferred embodiments to follow, taken in conjunction with the attached drawings.

DESCRIPTION OF THE PREFERRED EMBODIMENT

Figure 1:
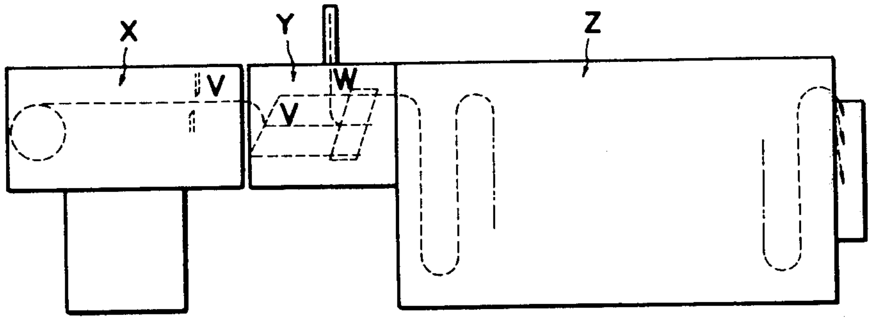
FIG. 1 is a diagrammatic side view of the photographic processing apparatus of the invention.

Referring to FIG. 1, there is shown a photographic processing apparatus according to the present invention, which includes a printer portion X, an automatic photographic paper or sheet distributing portion Y, which is the essential part of the apparatus, and an automatic developing portion Z.

The printer portion X is of a known type, in which a long photographic paper or sheet in a roll form is charged therein on one side thereof, then the sheet is paid out intermittently for printing from below by a light source positioned thereunder, and then the sheet thus printed is automatically cut to a size corresponding to a frame of a film as cut sheets 1, which in turn are delivered therefrom.

The automatic sheet distributing portion Y forms an essential part of the apparatus of the present invention, wherein small size photographic sheets thus cut to an E size or F-size are fed therein one by one intermittently and distributed in three rows, then delivered to an automatic feeding device, and to an automatic developing portion Z. In the case of a large size photographic sheet 2 of about 252 × 303 mm, it is fed one by one through an automatic feeding device in the distributing portion into the automatic developing portion Z to be described in more detail hereinafter.

The automatic developing portion Z includes a series of treatment tubs of the same size, which may be commonly used for the aforesaid cut sheets of a small size. Three runs of roller type conveying members are placed through the aforesaid series of treatment tubs. In the case of a large size photographic sheet, the aforesaid three runs of conveying members receive the large size sheet in cooperation with each other for development.

Figure 2:
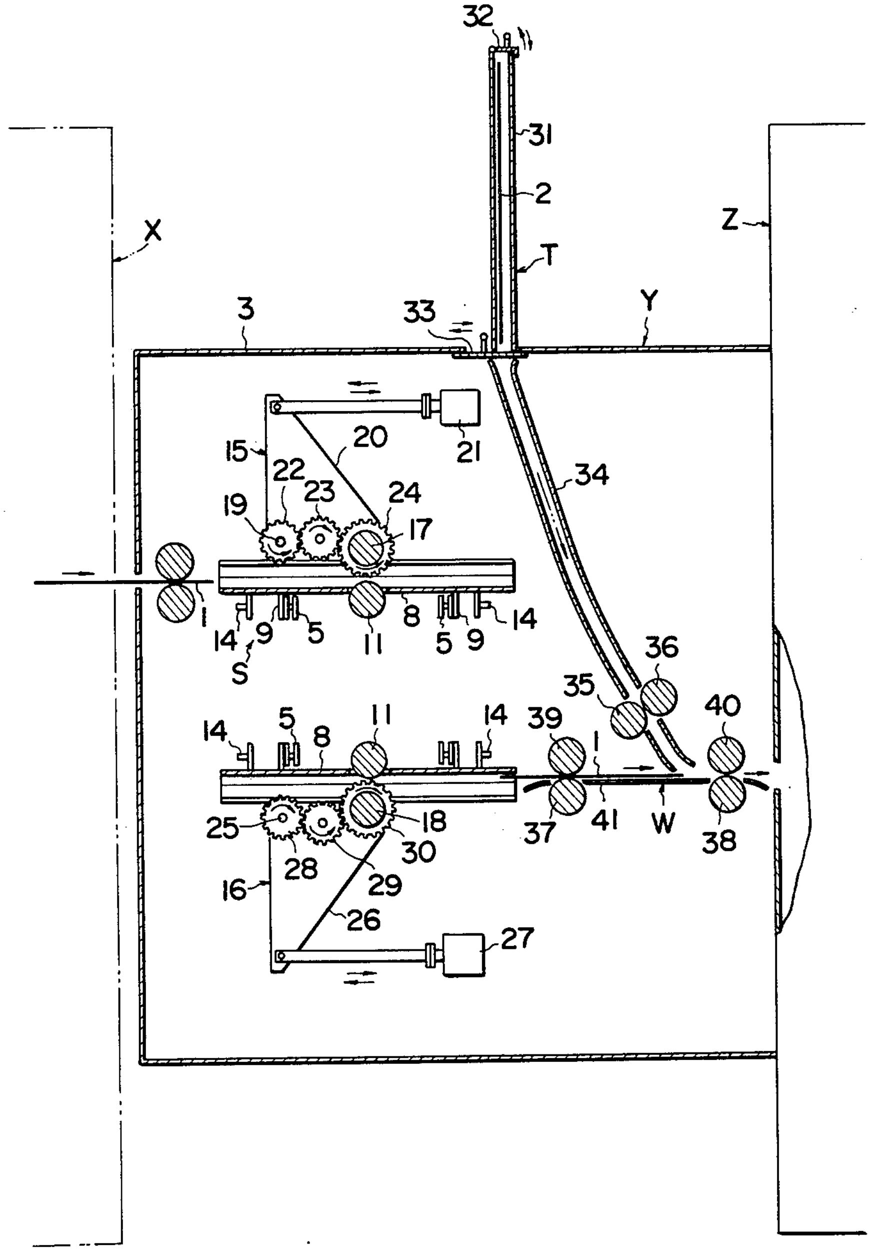
FIG. 2 is a longitudinal cross-sectional view of an automatic sheet-distributing portion, taken along the line I—I of FIG. 3.

As shown in FIG. 2, the automatic sheet distributing portion Y for photographic sheets includes an automatic distributing device S for small size photographic sheets; a supply device T for a large size photographic sheet; and an automatic sheet feeding device W. Description will first be turned to the automatic distributing device S housed in a casing 3.

Shown at 4 in the automatic distributing device S (FIGS. 3 and 5) is an endless conveying member which runs perpendicularly of a transporting or feeding path of small size printed sheets 1 from the printer portion X, and is positioned between the printer portion X and the automatic developing portion Z. Shown at 5, 5 (FIG. 5) are chains forming the endless conveying member 4. The chains 5, 5 are intermittently moved by means of an intermittent transmission device (not shown), which may be of a known type, through the medium of drive-side sprockets 6, 6 and idler-side sprockets 7, 7. Shown at 8 is a receiving tray which is secured to the endless chains 5, 5 through the medium of attaching means 9, 9 on the back surface thereof at a given pitch P (FIG. 3), or separation distance. As can be seen from FIGS. 3, 4, and 5, there are shown six receiving trays 8, half of which serves as a sheet receiving run and the other half of which serves as a sheet delivery run. The receiving tray 8 includes supporting portion 10, 10 adapted to support small size printed sheet 1 in a position above the bottom of the tray 8. The supporting portions 10, 10 are of a 'V' shape and open inwardly, and thus this configuration is suited for inverting the samll size printed sheets on the delivery run of the endless conveying member. An idler roller 11 is provided in the central portion of the receiving tray 8 in a projecting relation from the bottom of the tray, so that the printed sheet abuts the top surface of the idle roller. The idle roller 11 has its axis parallel with the direction of the moving endless chains 5, 5, and is rotatably supported to attaching plates 12, 12, which in turn are secured to the back surface of the tray 8. Part of the outer peripheral surface of the idle roller 11 is exposed from the bottom surface of the receiving tray 8 through an opening 13 provided therein. Shown at 14 are guide pins, which are attached to and project outwardly from the opposite sides of the tray 8 to engage guide rails provided around the peripheries of the sprockets 6, 7 to guide the receiving tray 8 when the tray 8 moves around the sprockets 6, 7 in engagement with guide rails provided around the peripheries of the sprockets 6, 7.

Figure 3:
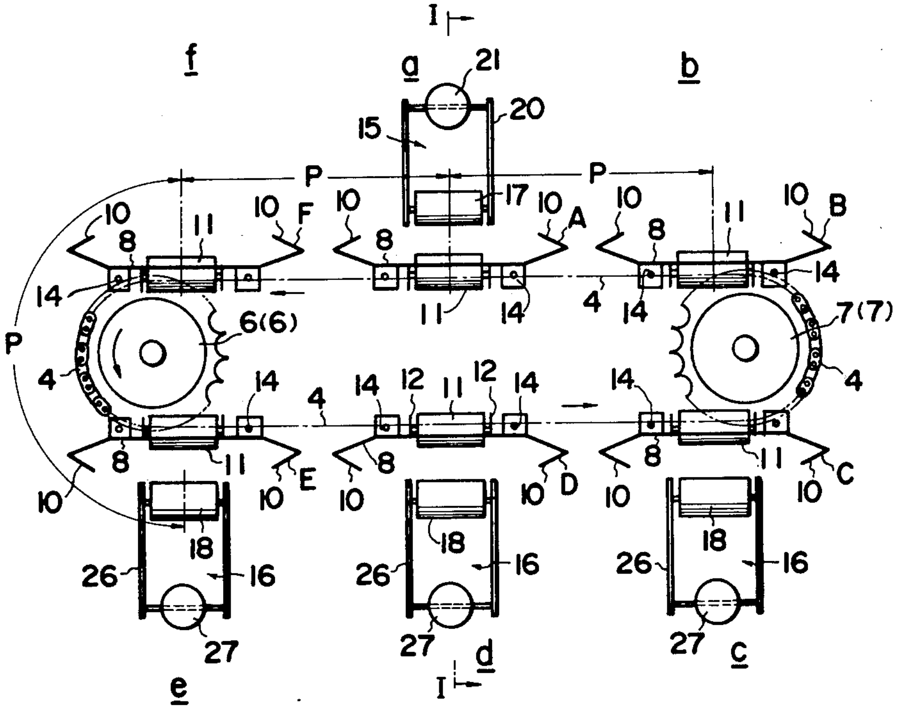
FIG. 3 is a transverse cross-sectional view of the automatic sheet distributing portion for printed photographic sheets.
Figure 4:
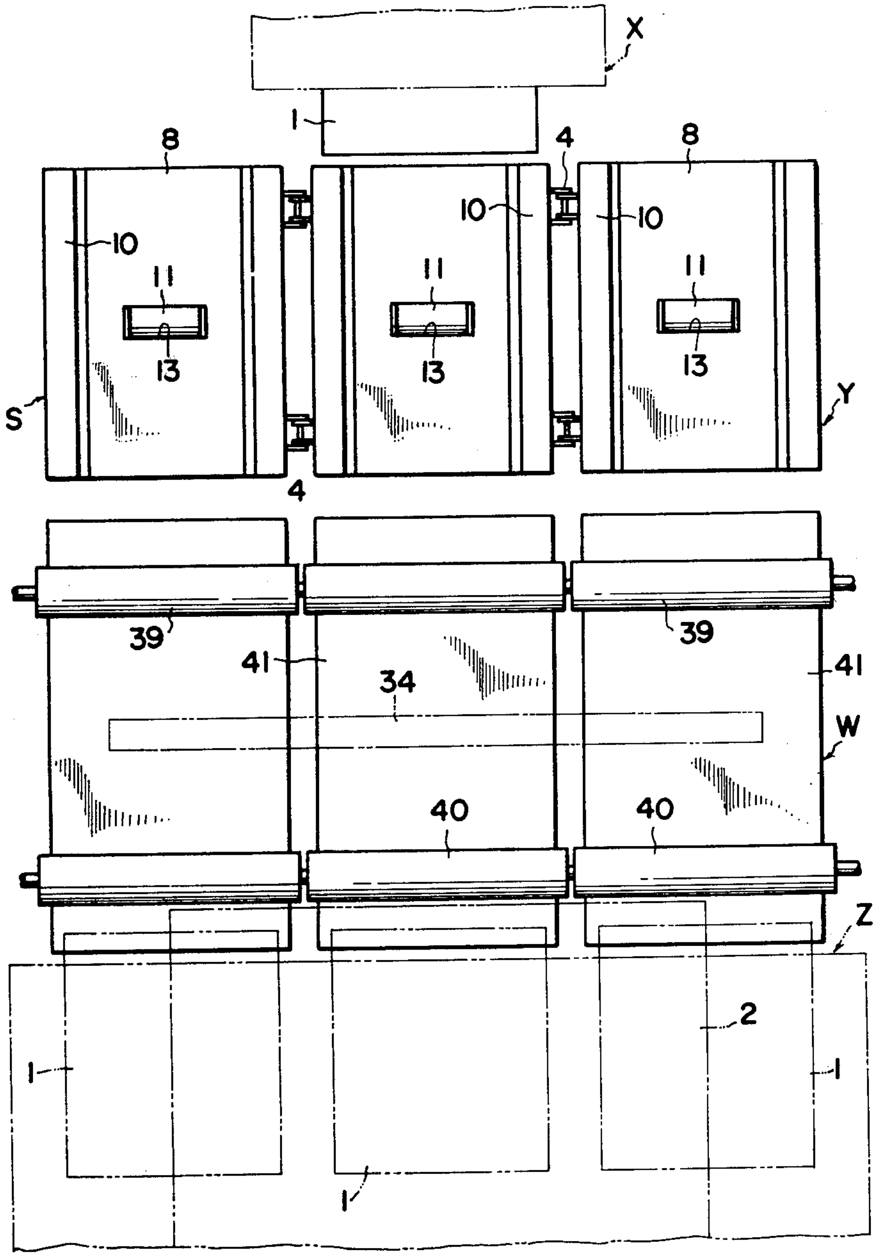
FIG. 4 is a diagrammatic plan view of the sheet distributing portion including the sheet receiving side and a sheet delivery side, particularly showing the positional relationship thereof.

As shown in FIGS. 2 and 3, a feeding member 15 is positioned in a position *a* for feeding printed sheets 1 into the automatic distributing device S. Shown at 16 is a delivery run of the endless conveying member 4, and there are three delivery positions *c, d, e,* thereon. Drive rollers 17, 18 are provided in the aforesaid positions *a, b, c, d, e,* respectively, and adapted to contact the idle rollers 11, respectively, while being rotated by a conventional drive means not shown. As shown in FIGS. 2 and 3, there is provided three-row distributing device. The position *a* is provided on the sheet receiving run of the endless chains 5, 5, while the positions *c, d, e* are provided on the sheet delivery run of the endless chains 5, 5. In this case, however, when the top surface of a photographic sheet is printed, then there may be eliminated the inverting operation of the sheets, so that the sheet delivery positions *c, d, e* may be lined up on the sheet receiving or upper run of the endless chains 5, 5.

The printed sheet feeding member 15 includes a rotary shaft 19 which pivotally supports the casing frame 20. Thus, the casing frame 20 may be pivotally moved about the shaft 19. A drive roller 17 is journaled in the front end of the casing frame 20. Shown at 21 is a member adapted to cause the pivotal movement of casing frame 20 about the rotary shaft 19, for instance, a solenoid. Shown at 22 is a drive gear secured to the drive rotary shaft 19 and adapted to mesh via an intermediate gear 23, with a gear 24 secured to the end of the drive roller, thereby rotating the drive roller 17. A casing frame 26 on the delivery side of the endless chains 5, 5 is pivotally moved about a drive rotary shaft 25 by means of a solenoid 27, and a drive gear 28 secured to the rotary shaft 25 meshes with an intermediate gear 29, which in turn meshes with a gear 30 secured to the end of the drive roller 18, thereby rotating the drive roller 18.

Description will be turned to the printed sheet feeding device W provided in the sheet distributing portion Y with reference to FIGS. 2 and 3. The device W feeds printed sheet or sheets to the automatic developing portion Z, and is positioned in the front or downstream of the sheet delivery positions *c, d, e.* The printed sheet feeding device W includes drive rollers 37, 38 adapted to be rotated by a conventional transmission means not shown, and idle rollers 39, 40 opposed thereto, and a guide plate 41 positioned between the rollers 37, 39 and 38, 40.

The supply device T for a large size printed sheet 2 includes a large-size-printed sheet sheath 31 provided with an openable lid 32 at its top, while the open lower end of the sheath leads into an opening provided in a top plate of the casing 3. Another lid 33 adapted to move back and forth along the top plate of the casing 3 is provided to close the lower end of the sheath 31. The supply device T further includes a large printed sheet chute 34 which includes drive roller 35 and an idle roller 36, and has its top end opened under the lower end of the sheath 31, and its lower end is open above the guide plate 41.

Description of the operation of the small-size-printed-sheet-distributing portion Y will begin with the operation of the automatic distributing device S which distributes printed sheets in three rows.

Figures 5, 6:
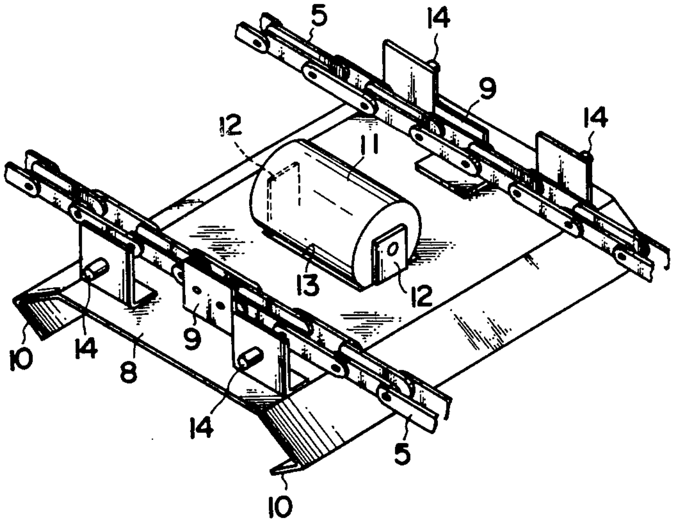
FIG. 5 is a perspective view of the back side of a receiving tray for a printed sheet.
FIG. 6 is a diagram showing the order of printed sheets being delivered from the delivery side of the automatic sheet distributing portion.

When the receiving trays 8 are moved intermittently in the direction of the arrows in FIG. 3 by means of the endless chains 5, 5, and one of the receiving tray A stops at the sheet receiving position *a*, then a printed small size sheet 1 is fed from the printer X. In this case, when the tip of the sheet 1 arrives under the drive roller 17, the sheet 1 actuates the solenoid 21 in a conventional manner so that the casing frame 20 of the feeding member 15 is pivotally moved about the shaft 19, and hence the drive roller 17 is lowered, while rotating, to contact the sheet 1, thereby delivering very the sheet into the receiving tray A under the cooperation of the idle roller 11. After the delivery of the sheet 1 into the receiving tray A, the solenoid 21 is actuated in a conventional manner so as to operate in the opposite direction, thereby lifting the drive roller 17. After the completion of the above operation, the endless chains 5, 5 are moved a given pitch P intermittently, and then stop. The above operation is repeated, so that the small size printed sheets 1 may be delivered into the other receiving trays B, C, D, E, F sequentially. The printed sheet 1 is supported by means of supporting portions 10, 10 and the idle roller 11 in a manner not to contact the bottom surface of the tray 8. The supporting portions 10, 10 are of 'V' shape and hence open inwardly as shown in FIGS. 3 and 5, so that the printed sheet will not come off the receiving tray, when inverted.

When the receiving trays A, B, C stop in the printed sheet delivery positions *e, d, c* (FIG. 6), the solenoids 27 corresponding thereto are actuated at the same time, so that the drive rollers 18 are lifted, while rotating, by means of the drive gears 28, so as to contact the small size printed sheets 1, respectively, after which the sheets may be delivered from the receiving trays 8 to the rollers of the feeding device W and then to the automatic developing portion Z by the cooperation of the idle rollers 11. The printed sheets 1 in the receiving trays D, E, F are also delivered from the delivery positions *e, d, c*. In this case, the aforesaid solenoids 27 may be actuated at the same time or at different timings, so that the pattern or order of printed sheets to be delivered to the automatic feeding device W may be varied.

As noted above, a large size photographic paper or sheet 2 of the aforesaid dimensions can not be processed by the aforesaid printer X or the automatic sheet distributing device S. Thus, a large size photographic sheet should be printed separately. The large size printed sheet 2 is supplied into the sheath 31 provided in the supply device T. Then, the lower end of the sheath 31 is opened by moving the lid 33, so that the large size sheet 2 may drop through the chute 34 and then fed by means of the drive roller 35 and its idle roller 36 from the lower end of the chute 34 onto the guide plate 41 in the automatic printed sheet feeding device W. When the leading edge of the sheet 1 arrives the drive roller 38 and its idle roller 40, then the sheet is delivered into the automatic developing portion Z for development by means of the automatic developing means provided in respective treatment tubs provided therein.

As is apparent from the foregoing description, according to the photographic processing apparatus according to the invention, a small size photographic paper or sheets such as E or F size are distributed in two or more rows by means of the automatic distributing device S to be fed to the automatic feeding device W provided in the automatic distributing portion Y for feeding the sheets to the automatic developing portion Z in two or more rows. Then, the sheets thus fed are developed by the automatic developing devices arranged in parallel therein. As a result, quick processing in shops may be further accelerated. In addition, a large size photographic sheet is not fed to the automatic distributing devices but to the large size sheet supply device T which is provided separately of the automatic distributing device in the sheet distributing portion Y, and then directly supplied to the automatic feeding device W, and from there to the automatic developing portion Z, in which the automatic developing devices are jointly used for development of a large size sheet. Thus, the developing portion may be used for both the small size and the large size photographic sheets, thereby providing considerable economy.

What is claimed is:

1. A processing apparatus for use in a series of photographic printing and developing operations, comprising:

a printer assembly for continuously printing, a sheet of photographic paper and delivering, in sequence, individually cut photographic prints of a first size;

a developing assembly for automatically developing said photographic prints; and a distributing assembly operatively connected between said printer assembly and said developing assembly for receiving said sequential flow of individual photographic prints from said printer and automatically arranging said prints in a selectable pattern for supplying said developing assembly with a sequential flow of a plurality of prints, said distributing assembly also having means to supply said developer assembly with a photographic print from a separate source of a size different than said cut prints from said printer assembly, said distributing assembly including a distributing device and a feeding device, said distributing device comprising:

a supply apparatus, including a drive roller, for feeding the photographic prints into said distributing assembly;

an endless conveying member having a receiving portion disposed adjacent to said supply apparatus for receiving the prints, and a delivery portion for delivering the prints from said distributing device, said conveying member moving perpendicular of the transporting path of photographic prints being delivered from said printer assembly;

a plurality of trays secured at predetermined separation distances on said conveying member and movable with said conveying member, each of said trays having supporting portions for receiving a print and supporting said print spaced from the bottom of said tray, and a roller rotatably supported on said tray and cooperating with said supporting portions to support said sheet, said roller being adapted to cooperate with said drive roller of said supply apparatus to feed a print into said tray; and means for controlling the operation of said conveying member to selectively position said trays at predetermined positions;

said feeding device being disposed adjacent to said delivery portion of said conveying member and having means for feeding a photographic print to said developing assembly;

said means for supplying said different-size photographic print including a supplying member for supplying said different-size print to said feeding device; and said developing assembly includes a series of treatment units, with at least two of said units being positioned in receiving alignment with at least two corresponding trays on the delivery portion of said endless conveying member.

2. A processing apparatus as set forth in claim 1, further including control means for sequentially positioning each of said trays in receiving alignment with said supply apparatus to receive a photographic print.

3. A processing apparatus as set forth in claim 1, further including at least two removal units disposed adjacent to said feeding device and in operative alignment with at least two trays on said delivery portion of said endless conveying member, each of said removal units having a roller adapted to cooperate with said tray roller, and control means operatively connected to said removal unit rollers whereby said removal unit rollers may be selectively operated to remove from said trays and to deliver a desired pattern of prints to said feeding device.

4. A processing apparatus as set forth in claim 1, wherein said treatment units are identical and cooperate to initiate the developing process alternatively for two of said cut prints or one of said different-size print.

* * * * *